Feb. 18, 1930.　　　　A. N. LARSEN　　　　1,747,637
ADJUSTABLE AEROPLANE WING
Filed Oct. 31, 1929　　　2 Sheets-Sheet 2
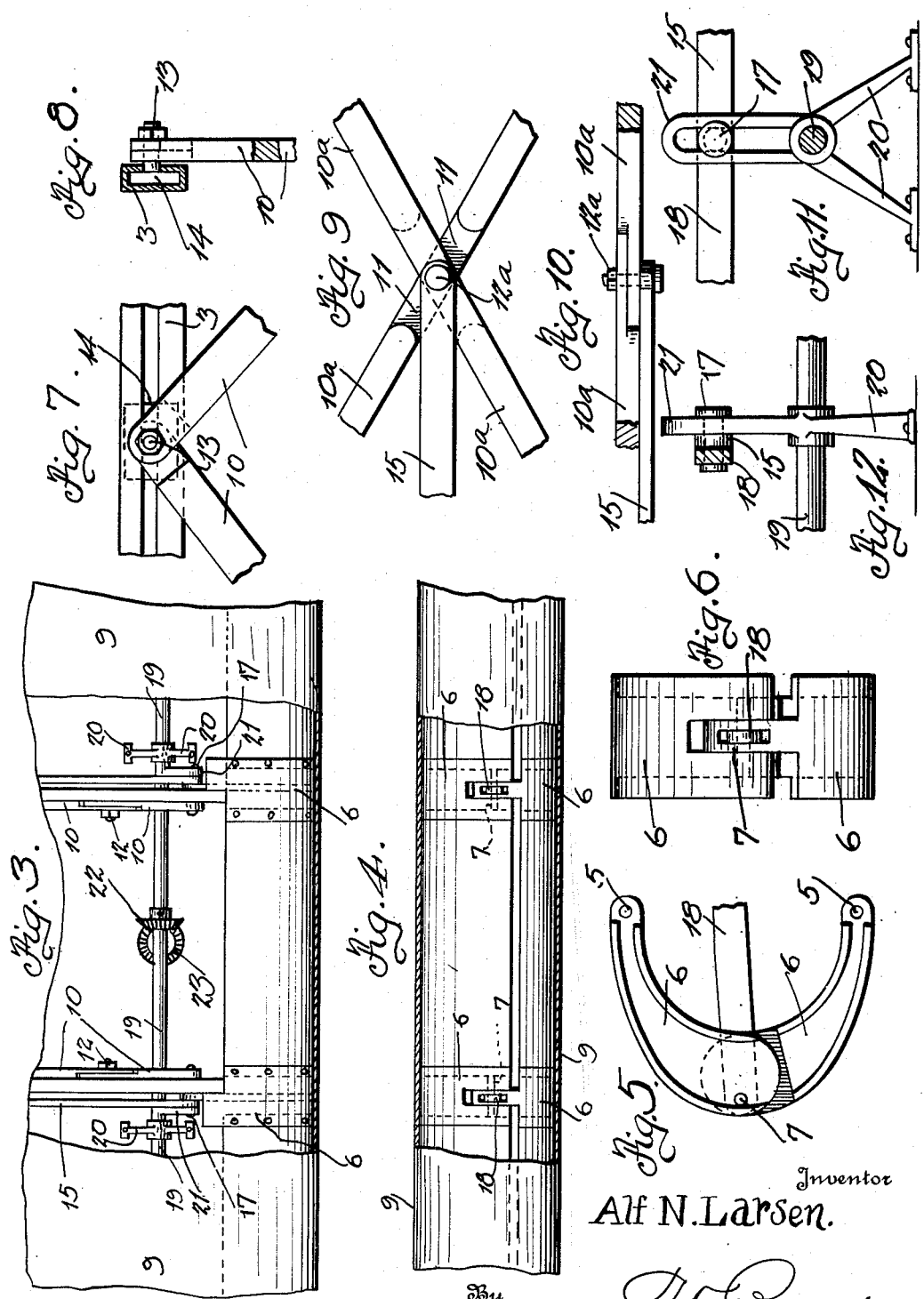
Inventor
Alf N. Larsen.

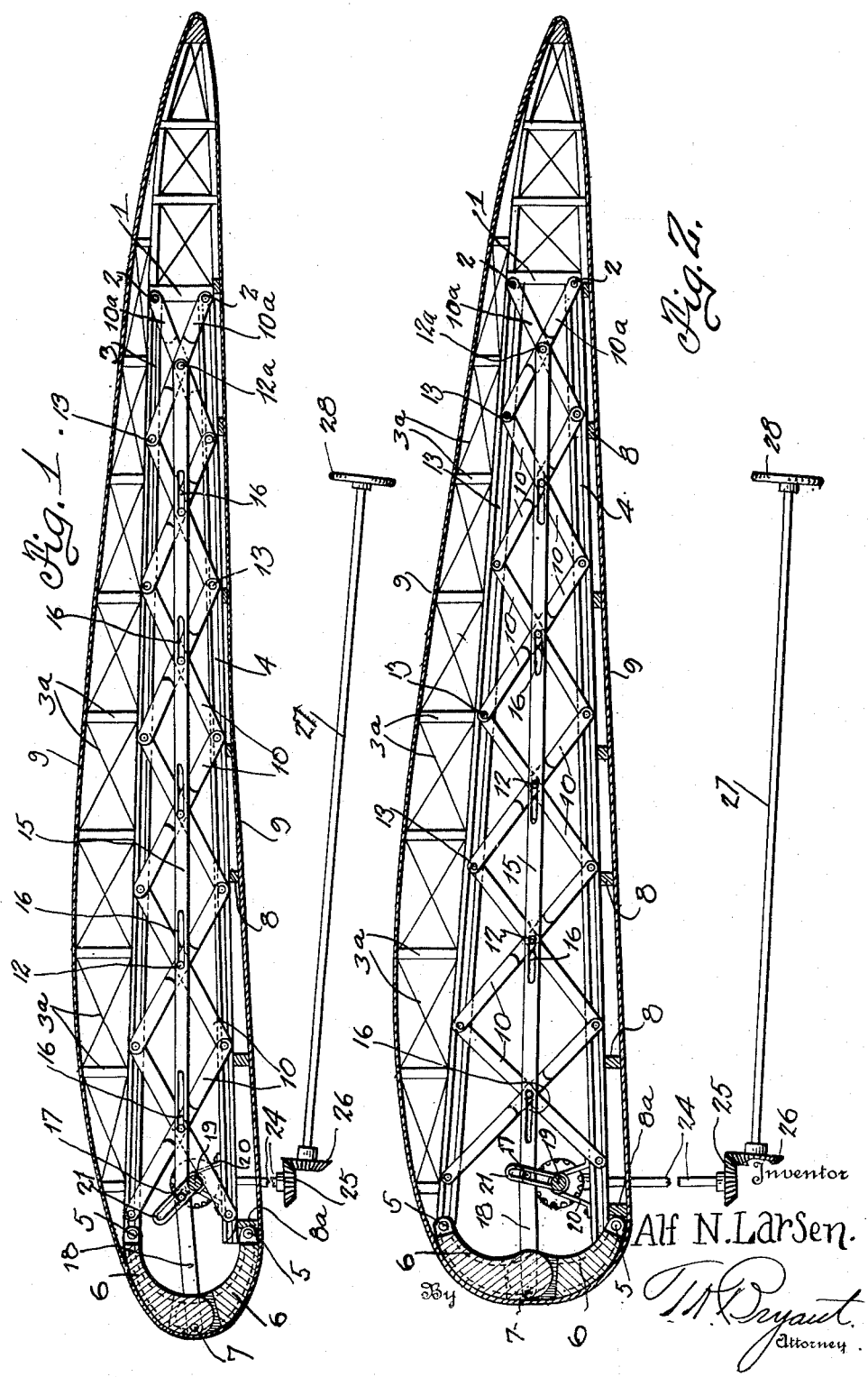

Patented Feb. 18, 1930

1,747,637

UNITED STATES PATENT OFFICE

ALF N. LARSEN, OF OGDEN, UTAH

ADJUSTABLE AEROPLANE WING

Application filed October 31, 1929. Serial No. 403,868.

This invention relates to certain new and useful improvements in adjustable aeroplane wings, and has for its primary object to provide in a single wing or plane structure the idea of converting the wing or plane from a high speed type, construction or thickness to a wing or plane of the high lift type that is of increased diameter or thickness.

A further object of the invention is to provide an adjustable aeroplane wing that may be adjusted as to its diameter or thickness by mechanism operable by a pilot of the aeroplane at any time desired, such as during flight to reduce the diameter or thickness of the plane or wing for increased speed or for increasing the diameter or thickness of the wing or plane to enhance the lifting power thereof to permit the carrying of increased weight.

With the above and other objects in view that will become apparent as the nature of the invention is better understood, the same consists in the novel form, combination and arrangement of parts hereinafter more fully described, shown in the accompanying drawing.

Figure 1 is a cross-sectional view of an adjustable aeroplane wing constructed in accordance with the present invention, showing a lazy tong arrangement of links and levers to be shifted by mechanism operable from the cock pit of the aeroplane for changing the diameter or thickness of the wing or plane to render the same serviceable for increased speed or increased lifting power, the diameter or thickness of the wing or plane illustrated in Figure 1 representing the position of the wing or plane for increased speed;

Figure 2 is a cross-sectional view, similar to Figure 1, showing the wing or plane adjusted to increased diameter or thickness to increase lifting power thereof;

Figure 3 is a fragmentary detail sectional view of the portion of the forward end of the wing or plane showing a longitudinal shaft operatively engaged with spaced lazy-tong constructions for changing the diameter or thickness of the wing or plane, it being understood that a plurality of lazy-tong constructions are arranged in spaced relation for the entire length of the wing or plane;

Figure 4 is a fragmentary front edge elevational view, partly broken away and shown in section of the wing or plane;

Figure 5 is a side elevational view of the pivotally connected curved arms associated with the forward end of each lazy-tong construction and engaged with the skin or wing covering;

Figure 6 is a front elevational view of the pivotally connected curved arms shown in Figure 5;

Figure 7 is a detail sectional view, showing the pivotally connected ends of adjacent links of the lazy-tongs and the channel guides associated therewith and engaged with the wing covering;

Figure 8 is a cross-sectional view of the connection shown in Figure 7;

Figure 9 is a fragmentary side elevational view of the cross pivotal connection between the rearwardly disposed links of the lazy tong with the operating rod attached thereto;

Figure 10 is a top plan view, partly in section of the construction shown in Figure 9;

Figure 11 is a fragmentary side elevational view of the bracket for supporting the operating shaft for the wing structure and the link extending from the operating shaft to the operating rod for the lazy-tong; and Figure 12 is a detail edge elevational view, partly in section of the construction shown in Figure 11.

The plane or wing structure is of the stream line type having confined therein the usual bracing and strengthening devices that do not form a material part of this invention and description of which will be omitted. The main idea disclosed in this invention is in the provision of mechanism for changing the diameter or thickness of the wing whereby the same may be a design for increased speed during flight or for increasing the lifting power thereof. As shown in Figures 1 and 2, the wing embodies a structural frame including a plurality of vertical posts 1 arranged adjacent the rear edge of the wing of reduced thickness and having pivotally connected thereto, as at 2, upper and lower channel guides 3 and 4 respectively, the forward ends of the channel guides 3 and 4 being pivotally connected as at 5 to the ends of a pair of curved arms 6 which in turn are pivotally connected together as at 7. As shown in Figure 2, the reinforcing structure includes spaced longitudinal brace bars 8 to which the lower channel guide 4 is attached, the forward brace bar 8ª having the lower curved arm 6 pivotally attached thereto and in effect pivotally attached to the forward end of the channel guide 4. An upper bracing structure 3ª is supported by the channel guide 3. The mechanism described is encased in the wing skin or covering 9 of the usual material employed for this purpose which is of a flexible nature.

A series of lazy-tong devices arranged in spaced relation within the wing structure are provided for increasing or decreasing the diameter or thickness of the wing to provide a wing design for the increased speed or a wing design for increased lifting power, each lazy-tong device including a plurality of cross-links 10 and 10ª reduced at their points of crossing as at 11 and pivoted together at their crossing points by the pins 12 and 12ª. The adjacent ends of the links 10 and 10ª are pivotally connected together as at 13, while the rear ends of the links 10ª are pivotally mounted upon the pins 2 as shown in Figures 1 and 2. The pivot pin 13 connecting the adjacent ends of the crossed links 10 and 10ª are each provided with a head or block 14 slidable in the channel guides 3 and 4. An operating rod is associated with the pins 12 and 12ª that pivotally connect the links 10 and 10ª, the rod 15 being attached at its rear end to the pivot pin 12ª with the rod provided with a series of spaced slots 16 into which the pivot pins 12 extend, the forward end of the rod 15 being attached to the pin 17 that also has attached thereto the rod 18 that is pivotally mounted at its forward end upon the pivot pin 7 between the curved arms 6 as shown in Figures 1, 2 and 5.

A shaft 19 extends longitudinally of the forward end of the wing structure and is supported in spaced bracket bearings 20 aligned with each rod 15 of a lazy-tong construction and has a link 20 extending therefrom and engaged with a pivot pin 17 between the rods 15 and 18, a link 20 being provided for each operating rod construction. As shown in Fig. 3, the shaft 19 has a bevel gear 22 fixed thereto that is engaged by the bevel gear 23 upon the upper end of the shaft 24 extending upwardly through the bottom of the wing structure. The lower end of the shaft 24 having a bevel gear 25 fixed thereto that is engaged by a bevel gear 26 upon the forward end of the shaft 27 having a handle 28 upon its rear end operable from a point to within the cock pit of the aeroplane.

The pivotally connected curved arms 6 are of considerable width as shown in Fig. 6 to provide a comparatively wide contact with the forward end of the wing covering 9, each lazy-tong construction having a pair of curved arms associated with the forward ends thereof. When the lazy-tong construction is in the position shown in Fig. 1, the diameter or thickness of the wing has been decreased providing for increased speed during flight. To increase the diameter or thickness of the wing for purposes of increasing the lifting power thereof, the operator of the aeroplane through the shaft and gear construction previously described, operates the shaft 19 for shifting the rods 15 and 18 to operate the lazy-tong links 10 and 10ª and the pivotally connected curved arms 6, the wing then assuming the position or design shown in Figure 2. When the lazy-tongs are expanded, the rods 15 and 18 are shifted rearwardly by the links 21 to move the channel guides 3 and 4 outwardly or apart from each other and to move the pivotally connected ends of the curved arms 6 rearwardly, the skin or covering 9 of the wing structure remaining at all times in a taut condition. The wing may be increased in diameter or thickness to increase its lifting power should the aeroplane be burdened with excess weight or during its initial rise from the ground, and during flight, the wing may be decreased in diameter or thickness to increase the speed during flight.

While there is herein shown and described the preferred embodiment of the present invention, it is nevertheless to be understood that minor changes may be made therein without departing from the spirit and scope of the invention as claimed.

I claim:—

1. An aeroplane wing comprising a wing structure including pairs of bars movable toward and from each other, the rear ends of the bars being pivoted on the wing structure, a pair of curved pivotally connected arms connecting the forward ends of each pair of bars and a lazy tong construction for each pair of bars for moving the bars to vary the thickness of the wing.

2. An aeroplane wing comprising a wing structure including pairs of bars movable toward and from each other, the rear ends of the bars being pivoted on the wing structure, a pair of curved pivotally connected arms connecting the forward ends of each pair of bars, a lazy tong construction for each pair of bars for moving the bars to vary the thickness of the wing, including a rod engaged with the rear end connection between the lazy tong links, and means for longitudinally shifting said rod.

3. An aeroplane wing comprising a wing structure including pairs of bars movable toward and from each other, the rear ends of the bars being pivoted on the wing structure, a pair of curved pivotally connected arms connecting the forward ends of each pair of bars, a lazy tong construction for each pair of bars for moving the bars to vary the thickness of the wing, including a rod engaged with the rear end connection between the lazy tong links, means for longitudinally shifting said rod, and a rod between the pivotal connection for the curved arms and the last named means to effect pivotal movement between the arms simultaneously with operation of the lazy tong construction.

4. An aeroplane wing comprising a wing structure including pairs of bars movable toward and from each other, the rear ends of the bars being pivoted on the wing structure, a pair of curved pivotally connected arms connecting the forward ends of each pair of bars and a lazy tong construction for each pair of bars for moving the bars to vary the thickness of the wing, the curved arms having comparatively wide outer sides contacting the wing covering to maintain the covering in a taut condition upon expansion and contraction of the wing structure.

5. An aeroplane wing comprising a wing structure including pairs of bars movable toward and from each other, the rear ends of the bars being pivoted on the wing structure, a pair of curved pivotally connected arms connecting the forward ends of each pair of bars, a lazy tong construction for each pair of bars for moving the bars to vary the thickness of the wing, including a rod engaged with the rear end connection between the lazy tong links, and means for longitudinally shifting said rod, the curved arms having comparatively wide outer sides contacting the wing covering to maintain the covering in a taut condition upon expansion and contraction of the wing structure.

6. An aeroplane wing comprising a wing structure including pairs of bars movable toward and from each other, the rear ends of the bars being pivoted on the wing structure, a pair of curved pivotally connected arms connecting the forward ends of each pair of bars, a lazy tong construction for each pair of bars for moving the bars to vary the thickness of the wing, including a rod engaged with the rear end connection between the lazy tong links, means for longitudinally shifting said rod, and a rod between the pivotal connection for the curved arms and the last named means to effect pivotal movement between the arms simultaneously with operation of the lazy tong construction, the curved arms having comparatively wide outer sides contacting the wing covering to maintain the covering in a taut condition upon expansion and contraction of the wing structure.

7. A aeroplane wing comprising a wing structure including pairs of bars movable toward and from each other, the rear ends of the bars being pivoted on the wing structure, a pair of curved pivotally connected arms connecting the forward ends of each pair of bars and a lazy tong construction for each pair of bars for moving the bars to vary the thickness of the wing, the curved arms having comparatively wide outer sides contacting the wing covering to maintain the covering in a taut condition upon expansion and contraction to the wing structure, the operating means including a shaft extending longitudinally of the wing, a link on the shaft engaged with the lazy tong construction, and means for rotating the shaft operable by the pilot seated in the aeroplane.

8. An aeroplane wing comprising a wing structure including pairs of bars movable toward and from each other, the rear ends of the bars being pivoted on the wing structure, a pair of curved pivotally connected arms connecting the forward ends of each pair of bars, a lazy tong construction for each pair of bars for moving the bars to vary the thickness of the wing, including a rod engaged with the rear end connection between the lazy tong links, means for longitudinally shifting said rod, the curved arms having comparatively wide outer sides contacting the wing covering to maintain the covering in a taut condition upon expansion and contraction of the wing structure, the operating means including a shaft extending longitudinally of the wing, a link on the shaft engaged with the lazy tong construction and means for rotating the shaft operable by the pilot seated in the aeroplane.

9. An aeroplane wing comprising a wing structure including pairs of bars movable toward and from each other, the rear ends of the bars being pivoted on the wing structure, a pair of curved pivotally connected arms connecting the forward ends of each pair of bars, a lazy tong construction for each pair of bars for moving the bars to vary the thickness of the wing, including a rod engaged with the rear end connection between the lazy tong links, means for longitudinally shifting said rod, a rod between the pivotal connection for the curved arms and the last named means to effect pivotal movement between the arms simultaneously with operation of the lazy tong construction, the curved arms having comparatively wide outer sides contacting tne wing covering to maintain the covering in a taut condition upon expansion and contraction of the wing structure, the operating means including a shaft extending longitudinally of the wing, a link on the shaft engaged with the lazy tong construction, and means for rotating the shaft operable by the pilot seated in the aeroplane.

In testimony whereof I affix my signature.

ALF N. LARSEN.